United States Patent
Lin et al.

(10) Patent No.: US 7,511,909 B2
(45) Date of Patent: Mar. 31, 2009

(54) SECTOR BASED TIMING RECOVERY FOR A READBACK SIGNAL

(75) Inventors: Yu Lin, Singapore (SG); Xiao Xin Zou, Singapore (SG)

(73) Assignee: Agency For Science, Technology And Research, Singapore (SG)

( * ) Notice: Subject to any disclaimer, the term of this patent is extended or adjusted under 35 U.S.C. 154(b) by 954 days.

(21) Appl. No.: 10/945,554

(22) Filed: Sep. 20, 2004

(65) Prior Publication Data

US 2006/0072426 A1 Apr. 6, 2006

(51) Int. Cl.
*G11B 5/09* (2006.01)
*G11B 5/035* (2006.01)

(52) U.S. Cl. .................................. 360/51; 360/65
(58) Field of Classification Search .......... None
See application file for complete search history.

(56) References Cited

U.S. PATENT DOCUMENTS

| | | | |
|---|---|---|---|
| 4,167,696 A | 9/1979 | Gyursanszky | |
| 4,459,558 A | 7/1984 | Graham | |
| 4,879,509 A | 11/1989 | Sometani et al. | |
| 5,065,116 A | 11/1991 | Ueda et al. | |
| 5,452,325 A | 9/1995 | Brown et al. | |
| 5,552,942 A | 9/1996 | Ziperovich et al. | |
| 5,717,619 A * | 2/1998 | Spurbeck et al. | 708/319 |
| 5,796,535 A * | 8/1998 | Tuttle et al. | 360/51 |
| 5,805,001 A | 9/1998 | Sheahan et al. | |
| 5,835,295 A | 11/1998 | Behrens | |
| 6,307,696 B1 | 10/2001 | Bishop et al. | |
| 6,487,573 B1 | 11/2002 | Jiang et al. | |
| 6,566,922 B1 | 5/2003 | Schell et al. | |
| 6,587,529 B1 | 7/2003 | Staszewski et al. | |
| 6,700,722 B2 | 3/2004 | Ruegg et al. | |
| 7,248,630 B2 * | 7/2007 | Modrie et al. | 375/233 |

OTHER PUBLICATIONS

Liu, Jingfeng, Song, Hongwei, and Kumar, B.V.K. Vijaya; "Dual Segmented Kalman Filters Based Symbol Timing Recovery for Low-SNR Partial Response Data Storage Channels"; Article; 2003; pp. 4084-4090; Carnegie Mellon University, Pittsburgh, PA; IEEE; USA.

Liu, Jingfeng, Song, Hongwei, and Kumar, B.V.K. Vijaya; "Timing Acquisition for Low-SNR Data Storage Channels"; Article; Sep. 2003; pp. 2558-2560; vol. 39, No. 5; IEEE Transactions on Magnetics; USA.

Liu, Jingfeng, Song, Hongwei, and Kumar, B.V.K. Vijaya; "Symbol Timing Recovery for Low-SNR Partial Response Recording Channels"; Article; 2002; pp. 1129-1136; Carnegie Mellon University, Pittsburgh, PA; IEEE; USA.

Barry, John R., Kavcic, Aleksandra, McLaughlin, Steven W., Nayak, Aravind, and Zeng, Wei; "Iterative Timing Recovery—Methods for Implemeintg Timing Recovery in Cooperation with Iterative Error-Control Decoding"; Magazine; Jan. 2004; pp. 89-102; IEEE Signal Processing Magazine; USA.

Liu, J., Song, H., and Kumar, B.V.K, Vijaya; "Timing Acquisition for Low-SNR Data Storage Channels"; Article; 2003; (1 page—DT-04); Carnegie Mellon University, Pittsburgh, PA; IEEE; USA.

Zeng, Wei, and Kavcic, Aleksandar; "MAP Detection in Noisy Channels with Synchronization Errors (Including the Insertion/Deletion Channel)"; Article; Jun. 29-Jul. 4, 2003; p. 232; ISIT 2003, Yokohama, Japan.

* cited by examiner

*Primary Examiner*—K. Wong
(74) *Attorney, Agent, or Firm*—Conley Rose, P.C.

(57) ABSTRACT

A method and a signal processing unit are proposed, for converting an asynchronous discrete-time signal to a synchronous discrete-time signal by performing sector-based timing recovery. The timing recovery includes aligning an initial portion of the asynchronous discrete-time signal to a first portion of a predetermined signal, and a later portion of the asynchronous discrete-time signal to a second portion of a predetermined signal. Optionally, the method and signal processing unit further perform sector based gain control, and sector-based removal of any dc component.

9 Claims, 6 Drawing Sheets

Fig 5(a) Before optimizing the resampling rate

Fig 5(b) After optimizing the resampling rate

SECTOR BASED TIMING RECOVERY FOR A READBACK SIGNAL

FIELD OF THE INVENTION

The present invention relates to a sector based read channel and method especially, although not exclusively, useful for data storage devices such as magnetic and optical storage media, e.g. in low signal-to-noise ratio (SNR) applications such as perpendicular recording. It also finds use in software or hardware channel characteristic tools, for example to synchronise a readout signal to a model output.

BACKGROUND OF THE INVENTION

Perpendicular recording records "magnetic bits" vertically onto the magnetic coating of a disk, rather then horizontally as with conventional longitudinal recording. Actually, there are two basic modes of perpendicular recording. One uses a single pole head for recording onto a double-layer perpendicular medium with a soft underlayer. The second mode uses a conventional longitudinal ring head and a medium without a soft underlayer.

Perpendicular recording has been proved to work at low SNR. However, it has been found that conventional timing recovery method does not work well at low SNR [13-18]. Therefore, practical methods for timing recovery for low SNR become very important as the transition from longitudinal recording towards perpendicular recording progresses.

To the knowledge of the inventors, hitherto no sector-based timing recovery techniques for acquisition and tracking, and no sector-based gain control methods, have been proposed in the magnetic recording literature.

Phase and frequency estimation has previously been used in methods for fast timing acquisition. To shorten the preamble length and to increase the acquisition speed in a data storage system, it is common to estimate the phase and to initiate a phase lock loop from a phase that close to the actual phase of the sampled preamble signal. This is commonly referred to as zero-phase restart. There are several reported studies in this area [1-16].

The methods described in references [5,8] employ an estimation of phase using the following principle: estimate the phase angle $\tau_k$ of the preamble at instants k, by computing, the DFT at a frequency $f_{nom}$, which the frequency of the preamble. For example if the preamble is a sequence y(k) which is the repeating sequence ++−−++−−

$$\ldots, f_{nom} \text{ is } \frac{1}{4T}$$

where T is the symbol interval. The DFT uses the preamble sequence y(k) to produce an estimate $\hat{\tau}_k$ the phase angle $\tau_k$ as follows:

$$\hat{\tau}_k = \frac{1}{2\pi f_{nom}} \arctan\left(\frac{\text{imag}[Y(f_{nom})]}{\text{real}[Y(f_{nom})]}\right),$$

where $\text{imag}[Y(f_{nom})]$ is the imaginary part of $Y(f_{nom})$, and $\text{real}[Y(f_{nom})]$ is the real part of $Y(f_{nom})$, and $$Y(f_{nom}) = \sum_{k=1}^{\text{length of preamble}} y(k)e^{-j2\pi f_{nom}k}$$

is the DFT of y(k) at $f_{nom}$.

The methods described in references [3, 13-16] employ joint estimation of phase and frequency. They all adopted the following principle:

1. Assume the phase angle $\tau_k$ satisfies: $\tau_k = \tau_0 + k\Delta f$, where $\Delta f = f_{actual} - f_{nom}$.
2. Estimate the phase angle of the preamble at instants k, by computing the DFT at frequency $f_{nom}$ using two samples of the preamble sequence y(k) for estimate the $\tau_k$ as follows.

$$\hat{\tau}_k = \frac{1}{2\pi f_{nom}} \arctan\left(\frac{\text{imag}[Y(f_{nom}, k)]}{\text{real}[Y(f_{nom}, k)]}\right),$$

where $\text{imag}[Y(f_{nom},k)]$ is the imaginary part of $Y(f_{nom}, k)$, and $\text{real}[Y(f_{nom},k)]$ is the real part of $Y(f_{nom},k)$, and $Y(f_{nom},k) = y(k)e^{-j2\pi f_{nom}k} + y(k+1)e^{-j2\pi f_{nom}k+1}$ is the DFT of y(k) at $f_{nom}$ calculated using two samples.

3. Using the estimation of the phase angle to do a linear curve fitting to equation $\tau_k = \tau_0 + k\Delta f$ to estimate $\tau_0$ and $\Delta f$.

It is also known that the best phase can be obtained by minimizing mean square error (MSE) between a predetermined signal and the preamble.

SUMMARY OF THE INVENTION

The present invention aims to provide a new and useful method for obtaining the timing of a readback signal, and a system for performing the method.

A first aspect of the present invention provides a method of converting an asynchronous discrete-time signal to a synchronous discrete-time signal, the method comprising applying sector-based timing recovery.

A second aspect of the present invention provides a timing recovery unit for converting an asynchronous discrete-time signal to be a synchronous discrete-time signal, the timing recovery unit comprising a processor arranged to apply sector based timing recovery to said asynchronous discrete-time signal.

In both cases, the sector based timing recovery may be performed by:

(i) aligning a first portion of the asynchronous discrete-time signal to a first portion of a predetermined signal, and (ii) aligning a second portion of the asynchronous discrete-time signal to a second portion of the predetermined signal.

In general terms, the present invention enables implementation of a sector based read channel with sector based timing recovery by adjusting the initial phase and the sampling frequency so that the first portion and the second portion of the processed readback signal best match a pre-determined signal. Specifically, there is realised a sector-based processor which does not require an AGC or a timing recovery loop.

Generally, the first portion of the asynchronous discrete-time signal is an "initial portion" of the signal, where as the second portion is an "ending portion". It should be understood that the term "initial portion" is not used here necessarily to mean the very beginning of the readback signal. Indeed, in some forms of the invention the signal contains a preamble (as in conventional systems) before the "initial portion" of the readback signal. Similarly, it is conceivable that the "ending portion" might not be at the very end of the asynchronous discrete-time signal. Rather the terms initial portion and ending portion are used here to mean that these portions are preferably located respectively before and after a section of user data in the readback signal.

In order to have a reference signal that has ideal timing and gain and approximates the readback signal, preferably in a data sector, there are at least two periods of known data. One at the initial portion and one at the ending portion. The sector-based read channel front-end adjusts the gain of the readback signal towards the gain of the reference signal that is predetermined. It then aligns the phase of the initial portion of the readback signal to the beginning portion of the predetermined signal. Once the initial portion of the readback signal is aligned to the initial portion of the pre-determined signal, it optimizes the sampling frequency of the readback signal by re-sampling the readback signal so as to align the end portion of the readback signal to the end portion of the pre-determined signal. The alignment criterion can be any of minimizing mean squared error, maximizing the cross-correlation, or minimizing the measured phase error between the readback signal and the predetermined signal using any phase error measurement methods in the literature.

There are several methods which use zero phase restart to align the initial portion of the data coarsely, and further acquisition of the phase is done by a phase locked loop [1-16]. However, as far as is known, no method for sector based timing recovery, gain control, or DC removal for recording systems has previously been disclosed.

BRIEF DESCRIPTION OF THE DRAWINGS

The present invention will now be explained in more detail by way of the following description of preferred embodiments and with reference to the accompanying drawings, in which:

FIG. 1 (a) shows a first application of a timing recovery unit;

FIG. 1 (b) shows a second application of the timing recovery unit;

FIG. 1 (c) shows the data format of a sector;

FIG. 5, which is composed of FIGS. 5(a) and 5(b), shows sample results at the beginning and the ending portions of y(k) and d(k), respectively before and after optimization of the resampling rate.

DESCRIPTION OF PREFERRED EMBODIMENTS

We will shortly describe timing recovery units which are embodiments of the present invention, and which are able to receive an asynchronous discrete-time signal, and convert it into a synchronous discrete time signal. As discussed in detail the timing recovery units which are embodiments of the invention may optionally also have the function of sector-based gain control and sector-based removal of DC components.

Figure 1A:
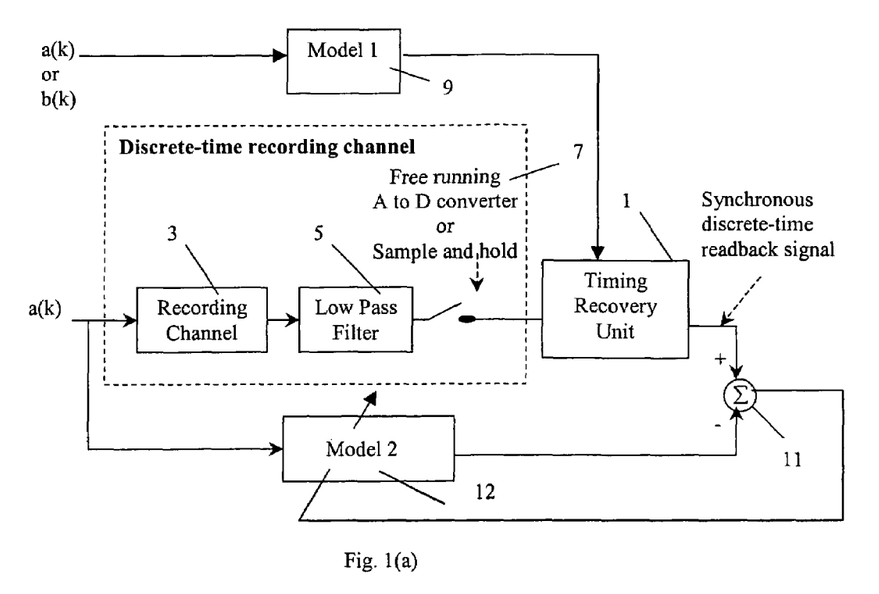

FIG. 1(a) illustrates a first system in which a timing recovery unit which is an embodiment of the invention may be used: a system for characterizing a channel. In this system user data which has been encoded (typically using run-length limited (RLL) and error correction code (ECC) encoding) is transformed into a data sequence of the kind shown in FIG. 1(c). This data is denoted here as $a(k)$, $k\_set = \{1, 2, \ldots, Len\}$, where Len is an positive integer that denotes the length of the entire section.

It optionally includes a preamble 31 which may be of any length, and may be periodic as in known preambles. However, it will be noted that the embodiments of the invention described below do not make use of the preamble (unlike the conventional devices described above, which use it for phase recovery).

It further includes a first known non-periodic pattern 33. It then includes the encoded user data 35. Finally, it includes a second non-periodic pattern 37.

The total number of encoded data bits 35 between the two known data patterns 33, 37 is a pre-determined number. This number may be chosen to be as long as possible such that the known patterns are sufficiently long to give a good synchronization accuracy which allows an acceptable bit error rate or sector failure rate.

Let b(k) denotes the entire sector of data with the encoded user data to be replaced by zeros. It can be noted that b(k) consists of the preamble (if any) and the two known data patterns.

For characterization applications, the predetermined signal d(k) can be produced by convolving b(k) or a(k) with the first model since user data is known.

The data a(k) is written onto a sector of the recording device, and then readback. The operation of the constructing the data, recording it and reading it back is illustrated schematically in FIG. 1(a) as the recording channel 3. The output of the recording channel 3 is passed to a low pass filter 5, and from there to a unit which is an A/D converter or which performs sample and hold operation. The sequence of the recording channel 3, low pass filter 5 and the A/D converter or sample-and-hold unit can be regarded as a discrete time recording channel 7, which produces an asynchronous discrete-time readback signal.

The timing unit 1, which is an embodiment of this invention, converts the asynchronous discrete-time readback signal into a synchronous readback-signal by performing a timing recovery in the manner described below.

In the application of FIG. 1(a), the system further employs a first approximate model 9 (such as a Lorentzian model for longitudinal recording, or a tanh model for perpendicular recording) as an initial model to produce the predetermined signal for synchronization. The model 9 can be a linear filter, a Volterra filter, a data dependent AR model, or any other model in the literature. After the timing recovery unit 1 has produced the synchronous readback signal, it is fed to a unit 11 which subtracts from it the output of a second model 12, to produce a feedback signal which is fed back to the second model 12 to improve it. The feedback mechanism can be any optimization algorithm in the literature, such as least squares method.

The input to the model 12 is the data a(k). The model 12 may again be a linear filter, Volterra filter, data dependent AR model, or any other model in the literature. Obtaining the second model 12 is the purpose of this embodiment.

Note that variations are possible in which there is only one model (the equivalent of model 9), and a feedback loop is instead used to improve that.

Figure 1B:
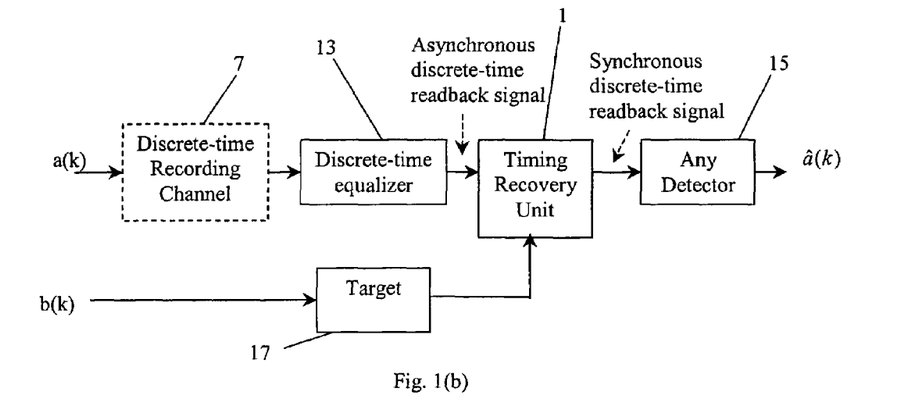
Figure 1C:
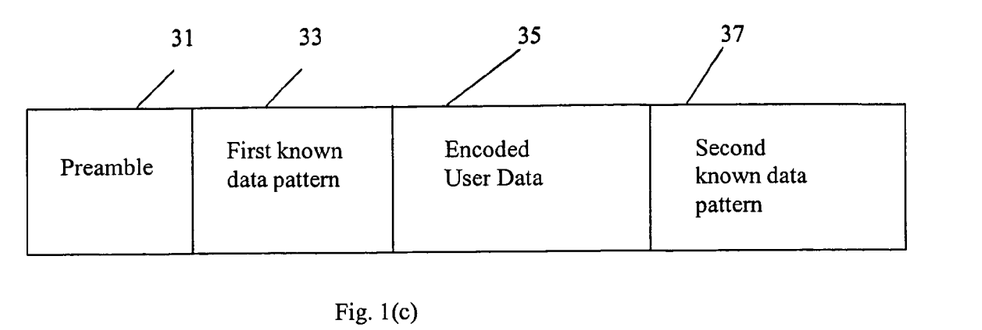

A second system in which the timing recovery unit 1 of the invention may be used is illustrated in FIG. 1(b), which is a receiver system. This system too includes a discrete-time recording channel 7 (with the same meaning as described above with reference to FIG. 1(a)). The output of the discrete-time recording channel 7 is input to a discrete-time equalizer 13 to produce an asynchronous discrete-time readback signal.

The recording channel introduces noise, distortions and timing variations. The equalizer shapes the channel in such a way that it shortens the channel response. The asynchronous discrete-time readback signal is input to the timing recovery unit 1, to produce a synchronous discrete-time readback signal. After obtaining the synchronous readback signal (i.e. the output of the equalizer without timing error), any detector 15 can be used to regain a signal $\hat{a}(k)$, which includes the detected RLL and ECC encoded data.

The target can be chosen from the literature or can be designed from a channel model. The resulting response of the channel and the equalizer approximates the response of the target.

Similarly, let the readback signal sequence be denoted by $\{y(k)\}$, where $k \in k\_set$.

The key operating principle of the unit 1 is to modify the asynchronous readback signal to have similar timing alignment as a predetermined signal $d(k)$ (where $k \in k\_set$) which is constructed using $b(k)$ and which has perfect timing. The first known data pattern can be used as synchronization mark and can also be used for alignment of the initial portion of the readback signal. The second known data pattern can be used for alignment of the ending portion of the readback signal.

$d(k)$ is also adjusted to have also perfect gain, and no DC errors, and the timing recovery unit 1 optionally also ensures that the signal it outputs obeys one or both of these criteria too. In this way, the readback signal can be processed as a simulation signal.

In the case of the synchronous characterizer system of FIG. 1(a), the predetermined signal $d(k)$ is generated by passing the $b(k)$ to the initial model 9, where the model is a filter that approximates the channel response.

In the case of the receiver system of FIG. 1(b), the predetermined signal $d(k)$ is generated by convolving $b(k)$ with a target.

Note that the readback signal can be a symbol rate sample sequence or an oversampled-rate sample sequence. In the latter case, when the oversampling-rate is not an integer, the sequence will be resampled to convert the sequence to an integer-sampling rate sequence. Let the integer-sampling rate be denoted by L. As above let the symbol interval be denoted as T. The sample interval is denoted as $T_s$, where $T_s=T/L$. An L times oversampling rate predetermined signal will be generated in the case that the readback signal is a L times oversampled sequence.

FIRST EMBODIMENT OF THE TIMING RECOVERY UNIT 1

In a first embodiment of the timing recovery unit 1, the initial portion of the readback signal is aligned to the predetermined signal by maximizing the cross correlation:

The synchronization can be done with the following steps a. Low pass filter the readback signal to remove the out-of-band noise.

b. Adjust the gain of the readback signal so that the readback signal has similar gain as the predetermined signal. This can be done by multiplying $y(k)$ by a gain factor $G_1$ where $G_1$ is given by $$G_1 = \sqrt{\frac{\sum_{k=M_1}^{M_2} d^2(k)}{\sum_{k=M_1}^{M_2} y^2(k)}}$$

where $M_1$ and $M_2$ are integers, and $M_2 > M_1$. $M_2$ is the value of k at the end of the first predetermined data pattern, and $M_1$ is the value of k at the beginning of the first known data pattern.

c. Remove the DC offset from the entire sector of readback signal by subtracting the mean of the entire sector of the readback signal from the readback signal.

d. Align the initial portion of the readback signal to a predetermined signal by maximizing the cross-correlation between the readback signal and the predetermined signal. This can be carried out as follows:

The cross-correlation signals can be calculated according to $$cor(i) = \sum_{k=M_1}^{M_2} d(k)y(k-i), \quad (1)$$

$$i = \{-N_1, -N_1+1, \ldots -1, 0, 1, 2, \ldots, N_2\}$$

Find out the maximum $|cor(i)|$, where $|x|$ denotes the absolute operation. Let the corresponding i be denoted by $i_{max}$.

The shifted version of the entire section of readback signal is multiplied by the sign of the maximum cross-correlation signal to produce a coarsely synchronized readback signal: $\{y_{coarse}(k)\} = \{y(k-i_{max})\text{sign}(cor(i_{max}))\}$.

In other words, this shifts the readback signal by $i_{max}$ number of samples, and makes the sign of signal $y_{course}(k)$ the same as that of $d(k)$. This step coarsely synchronizes the initial portion of the readback signal to the initial portion of the predetermined signal to within one to two sample intervals depends.

e. Search for the best phase within one to two sample intervals. This step refines the synchronization of the beginning portion of the readback signal to the beginning portion of the predetermined signal. It is performed as follows:

Shift the entire sector of readback signal by a fraction of $T_s$ using a filter. The shifted readback signal is given by $$y_{coarse}(k, \mu) = \sum_{n=0}^{N_w-1} y(k-n)w(n, \mu), \text{ for all } k \in k\_set \quad (2)$$

where $w(n,\mu)$ is an interpolation filter that shifts the entire sequence $\{y_{coarse}(k)\}$ by $\mu$. $N_w$ is the length of the filter.

For each value of $\mu$, compute the cross-correlation (or mean squared error) between the shifted readback signal and the predetermined signal. The cross-correlation $cor(\mu)$ can be calculated according to $$cor(\mu) = \sum_{k=M_1}^{M_2} d(k) y_{coarse}(k, \mu), \forall \mu \in \mu\_set \quad (3)$$

where $\mu\_set$ is a set that contains many phases. For example, it may be chosen to be $\mu\_set=\{-2T_s, -1.99T_s, \ldots 0, 0.01T_s, \ldots, 2T_s\}$.

Find the maximum $|cor(\mu)|$. Let the corresponding $\mu$ be denoted

The shifted version of the entire section of readback signal, $y_{coarse}(k,\mu_{max})$, will be taken to be the readback signal that is synchronized to the predetermined signal in the portion of the sector which is the first known data pattern and will be further processed in step f.

f. Align the final portion of the readback signal to the predetermined signal, by searching for the resampling rate that maximizes the cross-correlation (or minimizes the mean squared error) between the readback signal and a model output as follows:

Resample the entire section of readback signal at ratios close to 1 by using sampling rate converters in the literature [18 and its references].

Compute all the cross-correlations between the resampled readback signal and the predetermined signal $d(k)$. The cross-correlation signals can be calculated according to $$cor(R) = \sum_{k=M_3}^{M_4} d(k) y_{resampled}(k, \mu_{max}, R), \forall R \in R\_set \quad (4)$$

where $M_3$ and $M_4$ are integers, and $M_4 > M_3$. They define the window of the ending portion of the known data. R denotes the ratios, and R_set denotes the set of ratios. R_set can be chosen to be, for example, R_set=$\{0.9901\ 0.9902\ \ldots\ 1.0099\}$ if the maximum frequency error in the readback signal is $\pm 0.99\%$, and $y_{resampled}(k,\mu_{max},R)$ denotes the resampled readback signal resampled with ratio R.

Find out the maximum $|cor(R)|$. Let the corresponding R be denoted by $R_{max}$.

The resampled version of the entire section of readback signal, $y_{reampled}(k,\mu_{max},R_{max})$, will be taken to be the readback signal that is fully synchronous to the predetermined signal.

g. Fine-tune the gain of readback signal by minimizing the squared error.

This may be done by multiplying $y(k)$ by $G_2$ where $G_2$ is given by $$G_2 = \frac{y^T d}{y^T y},$$

where $y=[y(M_1)\ y(M_1+1)\ \ldots\ y(M_2)]^T$, and $d=[d(M_1)\ d(M_1+1)\ \ldots\ d(M_2)]^T$.

It may be noted that both $G_2$ may alternatively be computed using the second known data pattern. Alternatively, it may be calculated using both the known data patterns. (In fact, in an alternative form of the invention, $G_1$ also may have been calculated instead using the second known data pattern, or using both known data patterns.)

SECOND EMBODIMENT OF THE TIMING RECOVERY UNIT 1

Instead of searching $i_{max}$ and $\mu_{max}$ by shifting $y(k)$ to maximize the cross-correlation between $d(k)$ and $y(k)$, $i_{max}$ and $\mu_{max}$ can be obtained by shifting $d(k)$. Based on this idea, a second embodiment can be derived.

According to a second embodiment, alternative implementation of the idea can be given by replacing equations (1-4) respectively with equations (1a-4a) given below $$cor(i) = \sum_{k=M_1}^{M_2} d(k-i) y(k), \quad (1a)$$

$\forall i \in \{-N_1, -N_1+1, \ldots -1, 0, 1, 2, \ldots, N_2\}$ $$d(k, u) = \sum_{n=0}^{N_w-1} d(k-n) w(n, u), \text{ for all } k \in k\_set \quad (2a)$$

$$cor(u) = \sum_{k=M_1}^{M_2} d(k, \mu) y_{coarse}(k), \forall \mu \in \mu\_set \quad (3a)$$

$$cor(R) = \sum_{k=M_3}^{M_4} d_{resampled}(k, R) y(k, \mu_{max}), \forall R \in R\_set \quad (4a)$$

Because the invention aims to remove timing variations from $y(k)$, the timing error that described by $i_{max}$ and $\mu_{max}$ need to be removed from $y(k)$. Therefore, the following steps need to be performed.

1. Upon finding $i_{max}$ by maximizing $|cor(i)|$, $y_{course}(k)$ is also given by $\{y_{coarse}(k)\}=\{y(k-i_{max})\text{sign}(cor(i_{max}))\}$.

2. Upon finding $\mu_{max}$ by maximizing $|cor(\mu)|$, we need to compute $$y(k, \mu_{max}) = \sum_{n=0}^{N_w-1} y_{coarse}(k-n) w(n, \mu_{max}),$$

for all $k \in k\_set$ for further processing. This shifts the $y_{course}(k)$ by $\mu_{max}$. Therefore, the beginning portion of $y(k,\mu_{max})$ is phase synchronous to the beginning portion of $d(k)$.

3. In (4a), $d_{resampled}(k,R)$ denotes the resampled version of $d(k)$ sampled at rate R. Upon finding $R_{max}$ (which is the sampling rate that maximizes $|cor(R)|$), $y(k,\mu_{max})$ will be resampled with rate $R_{max}$. Let the resulting sequence be denoted as $y_{synchronized}(k)=y(k-i_{max}, \mu_{max}, R_{max})\text{sign}(cor(i_{max}))$. $y_{synchronized}(k)$ is the final sequence that has the same initial phase and the same sampling frequency as sequence $d(k)$.

In this embodiment, $d(k,\mu), \forall \mu \in \mu\_set$ and $d_{resampled}(k,R)$ $\forall R \in R\_set$ can be pre-computed and stored in table.

Third and fourth embodiments of the invention can be derived from the first and second embodiments changing the criterion from maximizing cross-correlation to minimizing mean squared error in searching for any one or more of $i_{max}$, $\mu_{max}$, or $R_{max}$.

Furthermore, to make the sign of y(k) to be the same as d(k), one may adopt the same steps given in Embodiments 1 and 2. Alternatively, one can determine whether we should change the polarity of y(k) by comparing the squared error or MSE between y(k) and d(k) and the MSE between −y(k) and d(k).

For example, if $(y-d)^T(y-d) > (-y-d)^T(-y-d)$, then flip the sign of y(k) sequence. where column vectors y and d can be vectors that include the beginning portion of the signals $d = [d(M_1)\ d(M_1+1) \ldots d(M_2)]^T$, $y = [y(M_1)\ y(M_1+1) \ldots y(M_2)]^T$, and can be vectors that include ending portion of the signals.

We now turn to discussing experimental results obtained using one of the embodiments of the invention discussed above. As will be seen, whereas the conventional timing recovery loop in a conventional read channel fails at low SNR, by contrast with the present invention:

The proposed sector based read channel front-end functions well at both low SNR and high SNR.

The proposed method is much simpler than the iterative timing recovery [17] and joint timing recovery and detection method [18] in the literature.

Experimental Results:

Signal Sets Used in the Experimental Evaluation

In these studies, we use readback signal from hard disk drive that includes a preamble. It should be noted that the preamble in the signal is not required for this method. The sampled readback signal is an oversampled rate sequence captured using an oscilloscope.

A symbol-rate readback sequence is obtained by first removing the out of band noise using a butterworth low pass filter, and then downsampling the oversample rate sequence.

Furthermore, the write data of the entire sector is known so that we can arbitrarily choose certain portion of data at the beginning for phase alignment and certain portion of the data at the ending portion for frequency adjustment. This illustrates that the proposed idea has the flexibility to use arbitrarily chosen data at the beginning and ending portions for phase and frequency optimization.

Figure 2:
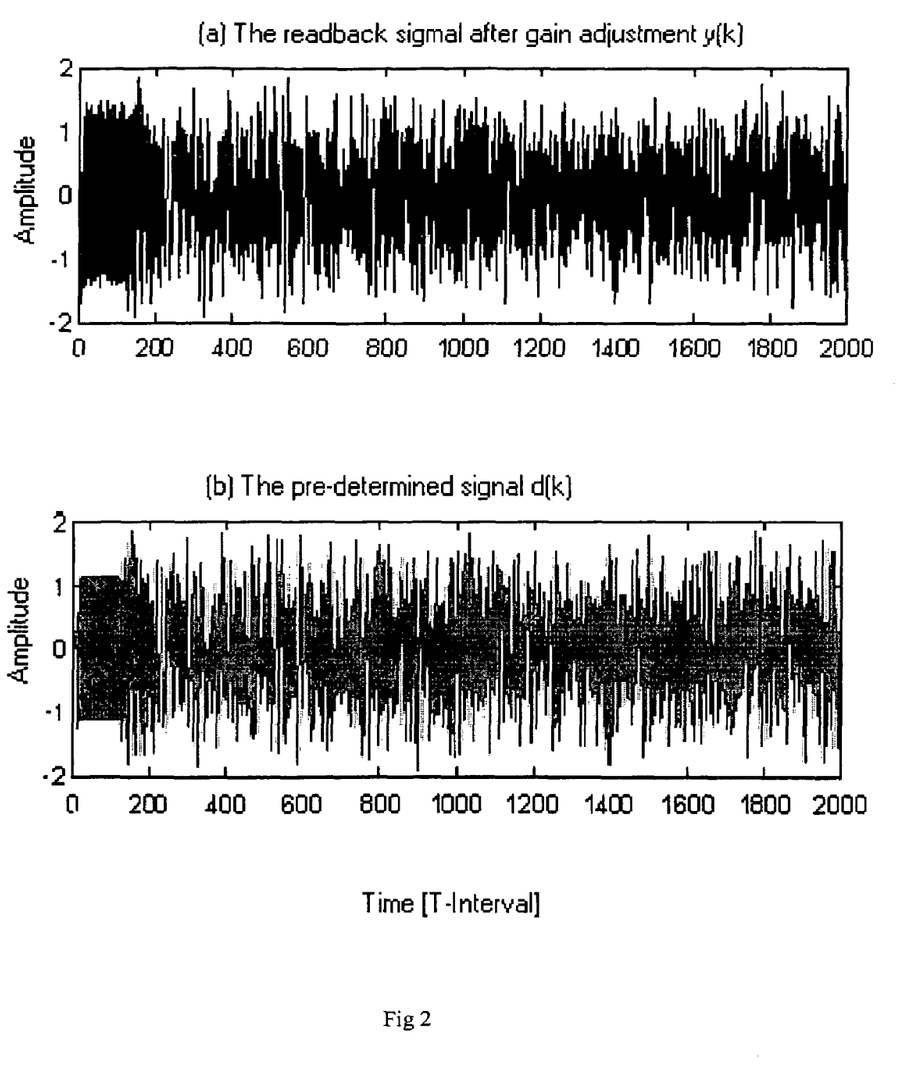
FIG. 2 shows (a) a readout signal from hard disk drive, y(k); (b) a pre-determined signal for the second application, d(k), which was generated by convolving a(k) with a model.

FIG. 2 depicts the readback signal and the predetermined signal after gain adjustment.

In the following case studies, the following parameters are used.

μ_set={−2T, −1.99T, ... 0, 0.01T, ... ,2T}. This setting means that the phase will be searched within ±2T with step size 0.01T R_set={0.9901 0.9902 ... 1.0099}. This setting means that the resampling rate will be searched within [0.9901, 1.0099] with step size 0.0001;

$M_1 = 350$, $M_2 = 700$, $M_3 = 3936$, $M_4 = 4235$. This setting means samples [y(350), y(351), ... y(700)] are used in the phase alignment, and sample [y(3936), y(3937), y(4235)] are used in the resampling rate optimization. Note that it is flexible to use the different samples at the beginning and ending portions for phase and frequency alignment. This setting is an example choice.

The readback signal and the predetermined signal are depicted in FIG. 2.

The predetermined signal shown in FIG. 2 does not have timing error. It is generated using Lorentzian pulse. The predetermined signal is give by $$y(k) = \sum_{n=0}^{N_h - 1} b(k-n) h(n) \text{ where}$$

$$p(t) = \frac{1}{1 + \left(\frac{2t}{PW50}\right)^2}, h(t) = p(t) - p(t-T), \text{ and}$$

$$h(n) \equiv h(t = nT).$$

Note that in practical systems, the entire sector of write data may not be known before detection, and therefore the unknown portions of data will be replaced by zeros. The known portions of data may be defined while defining the sector format.

Note that for perpendicular recording and optical recording a different model should be used to generate the predetermined signal. For equalized readback signal, the equalized channel or a target should be used for generating the predetermined signal.

Experimental Evaluation

The purpose of this case study is to demonstrate the invention works well at normal recording conditions using readback signal from drive.

Figure 3:
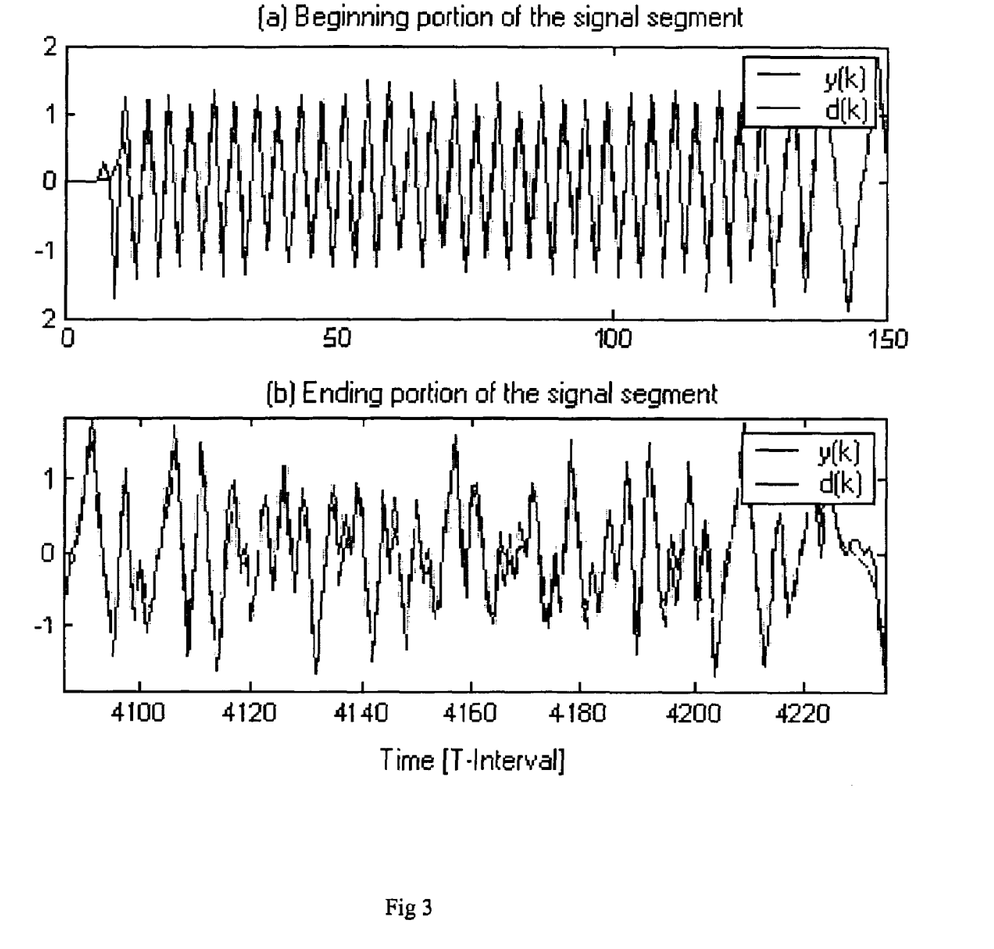
FIG. 3 shows synchronization results at (a) the beginning portions of y(k) and d(k); (b) the ending portions of y(k) and d(k)

One sample synchronization result using method described in the first embodiment is shown in FIG. 3, which shows the alignment of the beginning and ending portion of the signal, respectively. The results for the remaining are similar.

FIG. 3 (a) shows the beginning portions of y(k) and d(k), whereas FIG. 3(b) shows the ending portions of y(k) and d(k).

It can be observed from FIG. 3 that although the phase alignment using only part of the data, the phase of the entire sector of the readback signal is synchronous to the predetermined signal.

Experimental Evaluation:

The purpose of this evaluation is to evaluate the performance of the method at low SNR.

To evaluate the performance of the phase and frequency estimation methods at low SNR, we define the signal to noise ratio (SNR) as $$SNR = 20 \log_{10} \frac{1}{\sigma_n^2}$$

where $\sigma_n^2$ is an additive white Gaussian noise added to the readback signal.

It should be noted that the readback signal is not noiseless. The purpose of using this definition here is for the ease of quantifying the noise introduced into the readback signal. In this case study, SNR=7 dB.

In order to have a controlled amount of phase and frequency error, in this case study we begin with the synchronous readback signal obtained from the Case Study 1.

We examine the phase alignment capability and the frequency alignment capability of the method separately as follows:

Phase Alignment

To evaluate the robustness of the method, we purposely introduce a phase offset to the readback signal by shifting the entire sector of the noisy readback signal by $\mu_{orig}$, where $\mu_{orig}$ is uniform distributed within [−T, T]. Intuitively, to get back the original synchronous readback signal, the entire sector of readback signal should be shifted by $-\mu_{orig}$. In the following, we consider the phase shift that maximizes the cross-correlation (Embodiment 1 and 2) or minimizes the MSE (Embodiment 3 and 4) between y(k) and d(k) as the estimations of $\mu_{orig}$. The notations are given in Table 1.

TABLE 1

The phase offset notations.

| | |
|---|---|
| $\mu_{orig}$ | denotes the introduced phase shifts to the readback signal |
| $\hat{\mu}_{Cor}$ | denotes the phase shift that maximizes the cross-correlation (given in Embodiments 1 and 2. |
| $\hat{\mu}_{MSE}$ | denotes the phase shift that minimizes the MSE given in Embodiments 3 and 4. |

A Monte Carlo simulation of 4000 trials for the alignment of the beginning portion of the readback signal was performed. Since it cannot be ensured that the phase error between the beginning portion of the readback signal and the pre-determined signal is exactly zero. Therefore, the variance of the introduced phase offset and the variance of residual phase offset was measured. The residual phase offset is defined as the difference between $\mu_{orig}$ and its estimation. The results are tabulated in Table 2.

TABLE 2

The residual phase offset after compensation at SNR = 7 dB.

| | Introduced phase error $\mu_{orig}$ | Compensation criterion | |
|---|---|---|---|
| | | Minimize MSE $(\mu_{orig} - \hat{\mu}_{MSE})$ | Maximize Cross-correlation $(\mu_{orig} - \hat{\mu}_{Cor})$ |
| Variance | 0.3354 | 0.0078 | 0.0052 |
| Standard deviation | 0.5792 | 0.0884 | 0.0723 |

It can be observed from Table 2 that the variance of the phase error is reduced significantly after compensation. Furthermore, it can be observed that cross-correlation criterion provides better estimation than MSE criterion.

Figure 4:
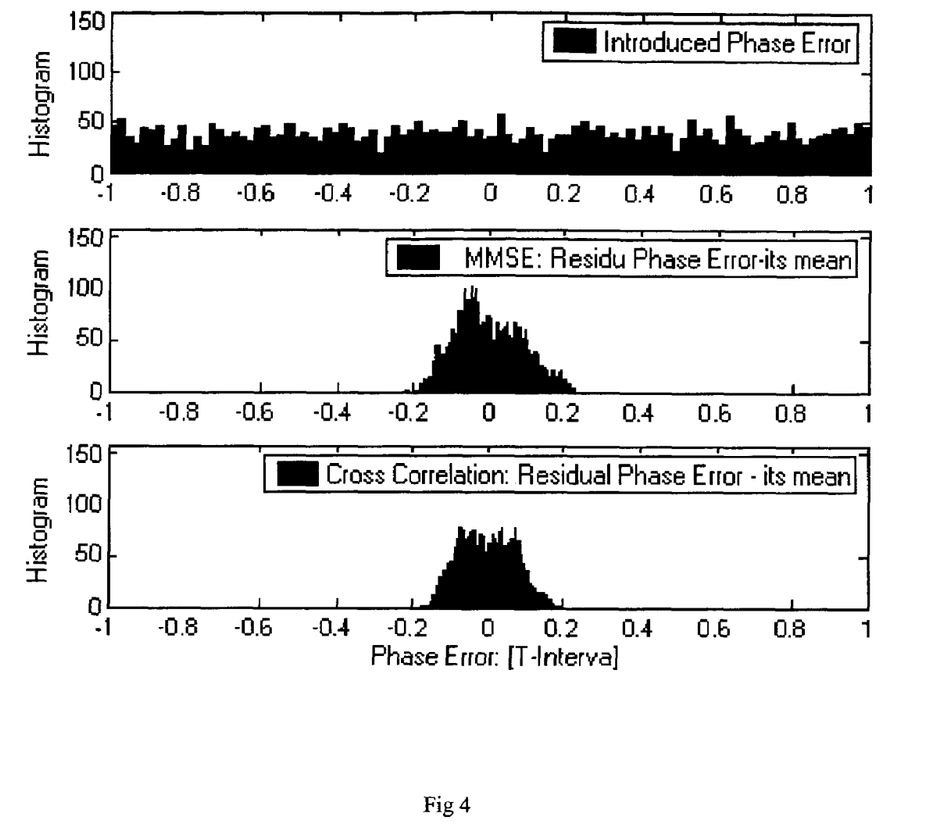
FIG. 4 shows a histogram of introduced phase error and the residue phase error after compensation.

FIG. 4 is a histogram of the introduced phase error and the residue phase error after compensation. It can be observed that after compensation the most of the phase errors are less than 0.1T and almost all residue phase errors are less than 0.2T. This shows that the phase estimation and compensation method described in this invention disclosure is effective in compensation phase error at low SNR.

Frequency Alignment

To evaluate the performance of the proposed frequency estimation methods, we introduced frequency offset into the readback signal by resampling the readback signal at rate $$\frac{1}{R_{orig}},$$

where $R_{orig}$ is a uniformly distribute in [−0.0005, 0.0005]. Because we are using Matlab's resampler to introduce the frequency offset which requires the resampling rate to be P/Q, where P and Q are integers. To simplify the simulation, $R_{orig}$ is further quantified with resolution 0.0001.

Intuitively, to get back the original synchronous signal, one needs to resample it with rate $R_{orig}$. In the following study, the resampling rate is estimated by finding the resampling rate that maximizes the cross-correlation (Embodiment 1 and 2) or minimizes the MSE (Embodiment 3 and 4) between d(k) and the reampled version of y(k).

We carried out a Monte Carlo simulation of 770 trials for the alignment of the ending portion of the readback signal by optimizing the resampling rate. The variance and standard deviation of $R_{orig}$, $R_{orig}-\hat{R}_{Cor}$ and $R_{orig}-\hat{R}_{MSE}$ are tabulated in Table 3, where $\hat{R}_{Cor}$ denotes the resampling rate that maximizes the cross-correlation between the ending portions of d(k) and y(k), and $\hat{R}_{MSE}$ denotes the resampling rate that minimizes the MSE between the ending portions of d(k) and y(k).

TABLE 3

The residual frequency offset after frequency compensation at SNR = 7 dB.

| | Introduced sampling rate error $R_{orig}$ | Compensation criterion | |
|---|---|---|---|
| | | Minimize MSE $(R_{orig} - R_{MSE})$ | Maximize Cross-correlation $(R_{orig} - R_{Cor})$ |
| Variance | $8.4 \times 10^{-8}$ | 0 | 0 |
| Standard deviation | $2.89 \times 10^{-4}$ | 0 | 0 |

It can be observed from Table 3 that the variance of the resampling rate error is zero after compensation. This shows that the proposed invention works extremely well at low SNR for recovering the ideal timing. The zero variance is also because we introduced quantified frequency error with resolution 0.0001, and we optimize the resampling rate by searching the resampling rate with the same resolution. In practical systems, this will not be true. However, this result is sufficient to confirm that the method works extremely well if the optimization resolution is sufficiently high.

Figure 5A:
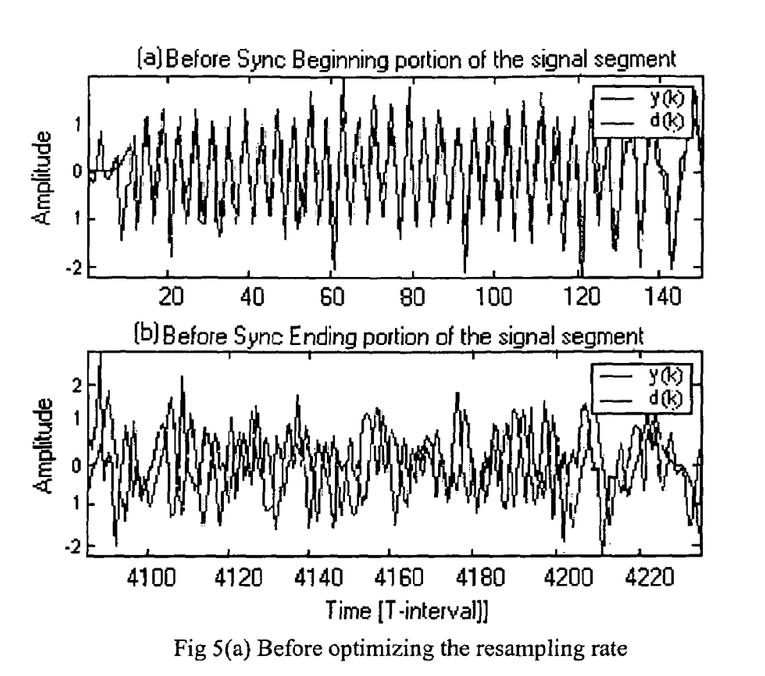
Figure 5B:
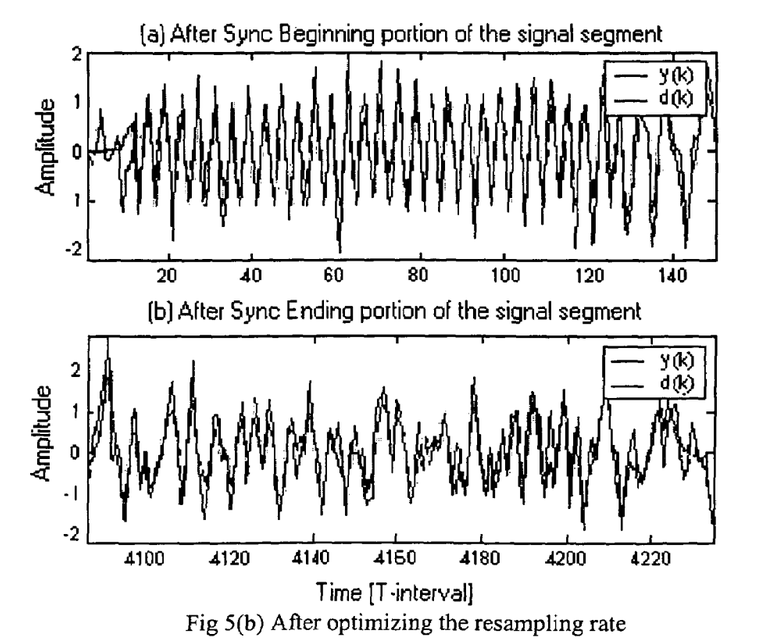

FIG. 5 depicts one sample result before and after resampling rate optimization. It can been seen that the proposed method works well at SNR=7 dB.

Thus, it can be appreciated that the method of the present invention is much simpler than the iterative timing recovery [17] and joint timing recovery and detection method [18].

REFERENCES

[1] U.S. Pat. No. 6,700,722, "High-speed zero phase restart of a multiphase clock".
[2] U.S. Pat. No. 6,587,529, "Phase detector architecture for phase error estimating and zero phase restarting".
[3] U.S. Pat. No. 6,566,922, "Zero phase and frequency restart PLL".
[4] U.S. Pat. No. 6,307,696, "Digital zero-phase, restart circuit".
[5] U.S. Pat. No. 5,835,295, "Zero phase restart interpolated timing recovery in a sampled amplitude read channel H".
[6] U.S. Pat. No. 5,805,001, "Zero phase circuit for sampled data phase locked loop".
[7] U.S. Pat. No. 5,552,942, "Zero phase start optimization using mean squared error in a PRML recording channel H".
[8] U.S. Pat. No. 5,452,325, "Averaging zero phase start for phase locked loops H"
[9] U.S. Pat. No. 5,065,116, "Zero phase restart compensation for VCO".
[10] U.S. Pat. No. 4,879,509, "Zero-phase-sequence voltage sensing apparatus".

[11] U.S. Pat. No. 4,459,558, "Phase locked loop having infinite gain at zero phase error".
[12] U.S. Pat. No. 4,167,696, "Zero phase switching for multi-phase systems".
[13] Jingfeng Liu; Hongwei Song; Kumar, B. V. K. V.; "Symbol timing recovery for low-SNR partial response recording channels", IEEE Global Telecommunications Conference, 2002. GLOBECOM '02. Volume: 2, Nov. 17-21, 2002, pages: 1129-1136.
[14] Liu, J.; Song, H.; Kumar, B. V. K. V.; "Timing acquisition for low-snr data storage channels", IEEE International Magnetics Conference, 2003. INTERMAG 2003, Mar. 28-Apr. 3, 2003, Pages:DT-04-DT-04
[15] Jingfeng Liu; Hongwei Song; Vijaya Kumar, B. V. K.; "Timing acquisition for low-SNR data storage channels", IEEE Transactions on Magnetics, Volume: 39, Issue: 5, September 2003, Pages:2558-2560
[16] Jingfeng Liu; Hongwei Song; Kumar, B. V. K. V.; "Dual segmented kalman filters based symbol timing recovery for low-SNR partial response data storage channels", IEEE Global Telecommunications Conference, 2003. GLOBECOM '03, Volume: 7, 1-5 December 2003.
[17] J. Barry, A. Kavčić, S. McLaughlin, A. Nayak, W. Zeng, "Iterative Timing Recovery," to appear in IEEE Signal Processing Magazine, January 2004.
[18] Wei Zeng, A. Kavčić, MAP Detection in Noisy Channels with Synchronization Errors (Including the Insertion/Deletion Channel), Proc. ISIT 2003.
[19] U.S. Pat. No. 6,487,573 "Multi-rate digital filter for audio sample-rate conversion".

The invention claimed is:

1. A data readback system including:
a channel unit for obtaining a readback signal by reading a digital signal, the digital signal being recorded on a data storage medium and including a first known data pattern and a second known pattern, spaced apart by encoded user data;
a predetermined signal generating unit arranged to generate a predetermined signal by convolving an intermediate signal comprising the first known pattern and the second known data pattern spaced apart by zeros with a target; and
a timing recovery unit for converting an asynchronous discrete-time one-dimensional signal obtained from the readback signal into a synchronous discrete-time signal, the timing recovery unit comprising a processor arranged to apply sector based timing recovery to said asynchronous discrete-time one-dimensional signal by:
(i) aligning a first portion of the asynchronous discrete-time one-dimensional signal to a first portion of the predetermined signal, and
(ii) aligning another portion of the asynchronous discrete-time one-dimensional signal to a second portion of the predetermined signal.

2. A data readback system including:
a channel unit for obtaining a readback signal by reading a digital signal, the digital signal being recorded on a data storage medium and including a first known data pattern and a second known pattern, spaced apart by encoded user data;
a predetermined signal generating unit arranged to generate a predetermined signal by convolving an intermediate signal comprising the first known pattern and the second known data pattern spaced apart by zeros, with a first model approximating a channel response; and
a timing recovery unit for converting an asynchronous discrete-time one-dimensional signal obtained from the readback signal into a synchronous discrete-time signal, the timing recovery unit comprising a processor arranged to apply sector based timing recovery to said asynchronous discrete-time one-dimensional signal by:
(i) aligning a first portion of the asynchronous discrete-time one-dimensional signal to a first portion of the predetermined signal, and
(ii) aligning another portion of the asynchronous discrete-time one-dimensional signal to a second portion of the predetermined signal.

3. The data readback system of claim 2, further comprising a second model approximating channel response, and a mechanism using the synchronous discrete-time one-dimensional signal and the digital signal to improve the second model.

4. The data readback system of claim 2, wherein the processor is arranged to align the first portion of the asynchronous discrete-time one-dimensional signal to a first portion of the predetermined signal by maximizing at least one cross-correlation function.

5. A data readback system including:
a channel unit for obtaining a readback signal by reading a digital signal, the digital signal being recorded on a data storage medium and including a first known data pattern and a second known pattern. spaced apart by encoded user data; and
a timing recovery unit for converting an asynchronous discrete-time one-dimensional signal obtained from the readback signal into a synchronous discrete-time signal, the timing recovery unit comprising a processor arranged to apply sector based timing recovery to said asynchronous discrete-time one-dimensional signal by:
(a) aligning a first portion of the asynchronous discrete-time one-dimensional signal to a first portion of the predetermined signal by:
(i) maximizing a first cross-correlation function with respect to an integer variable k indicative of a symbol value, to obtain a first coarse alignment; and
(ii) maximizing a second cross-correlation function with respect to a variable indicative of phase and taking values spaced apart by less than the symbol interval; and
(b) aligning another portion of the asynchronous discrete-time one -dimensional signal to a second portion of the predetermined signal.

6. The data readback system of claim 5, wherein said processor is arranged to align the other portion of the asynchronous discrete-time one-dimensional signal to a second portion of the predetermined signal by maximizing a third cross-correlation function with respect to a variable indicative of a resampling ratio.

7. A data readback system including:
a channel unit for obtaining a readback signal by reading a digital signal, the digital signal being recorded on a data storage medium and including a first known data pattern and a second known pattern, spaced apart by encoded user data; and
a timing recovery unit for converting an asynchronous discrete-time one-dimensional signal obtained from the readback signal into a synchronous discrete-time signal, the timing recovery unit comprising a processor arranged to apply sector based timing recovery to said asynchronous discrete-time one-dimensional signal by:
(a) aligning a first portion of the asynchronous discrete-time one-dimensional signal to a first portion of the predetermined signal by:

(i) minimizing a first mean-squared error function with respect to an integer variable k indicative of a symbol value, to obtain a first coarse alignment; and (ii) minimizing a second mean-squared error function with respect to a variable indicative of phase and taking values spaced apart by less than the symbol interval; and (b) aligning another portion of the asynchronous discrete-time one-dimensional signal to a second portion of the predetermined signal.

8. The data readback system of claim 7 wherein said processor is arranged to align another portion of the asynchronous discrete-time one-dimensional signal to a second portion of the predetermined signal by minimizing a third mean-squared error function with respect to a variable indicative of a resampling ratio.

9. A data readback system including:

a channel unit for obtaining a readback signal by reading a digital signal, the digital signal being recorded on a data storage medium and including a first known data pattern and a second known pattern, spaced apart by encoded user data; and a timing recovery unit for converting an asynchronous discrete-time one-dimensional signal obtained from the readback signal into a synchronous discrete-time signal, the timing recovery unit comprising a processor arranged to apply sector based timing recovery to said asynchronous discrete-time one-dimensional signal by:

(a) aligning a first portion of the asynchronous discrete-time one-dimensional signal to a first portion of the predetermined signal;

(b) aligning another portion of the asynchronous discrete-time one-dimensional signal to a second portion of the predetermined signal; and (c) adjusting the gain of the synchronous discrete-time signal by a gain factor obtained by a comparison of a least one portion of the asynchronous discrete-time one-dimensional signal and at least one corresponding portion of the predetermined signal.

* * * * *